July 31, 1928.　　　　J. F. CONNELL　　　　1,678,690
BAKING DEVICE
Filed June 24, 1927　　　3 Sheets-Sheet 1

Inventor
J. F. Connell,
By Clarence A. O'Brien
Attorney

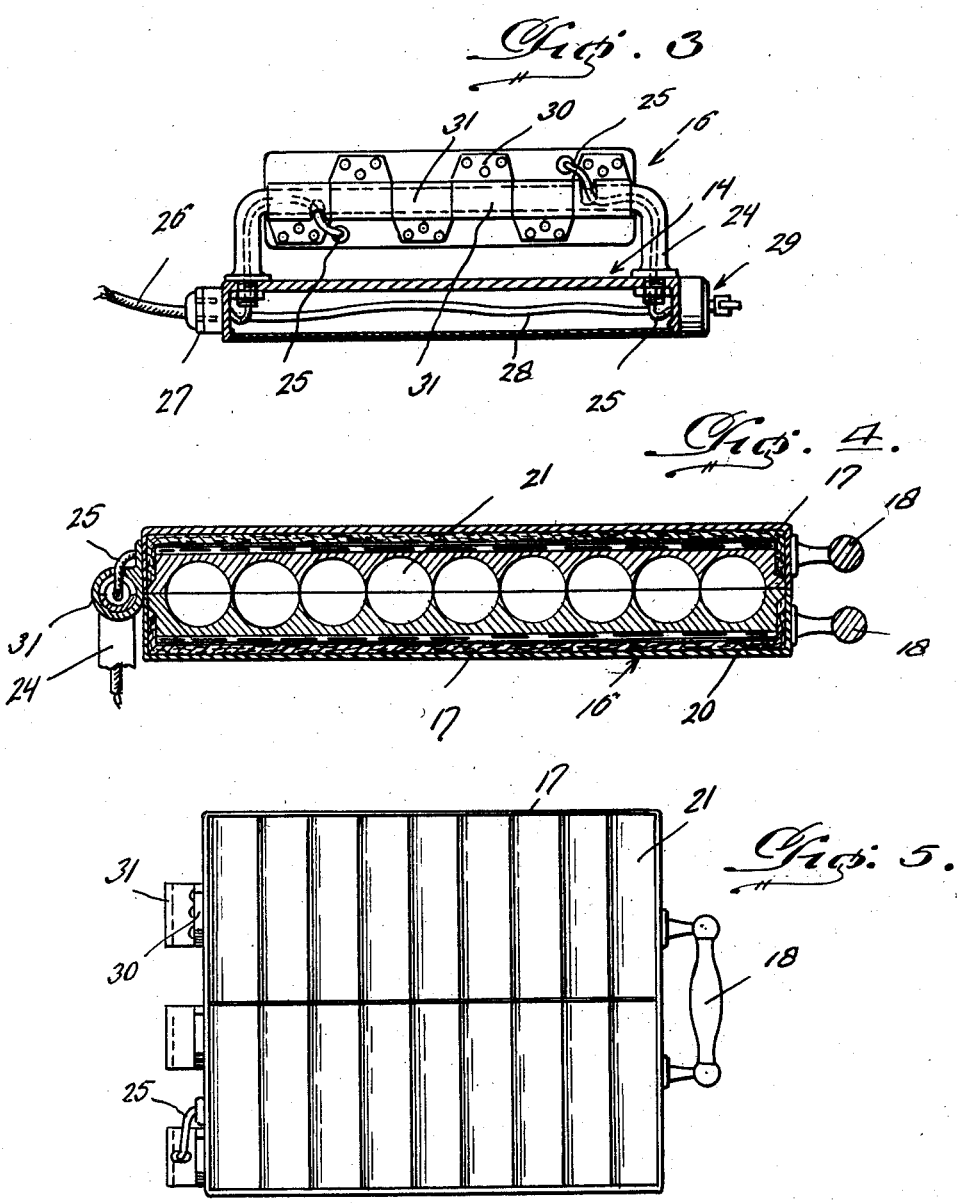

July 31, 1928.
J. F. CONNELL
BAKING DEVICE
Filed June 24, 1927     3 Sheets-Sheet 3
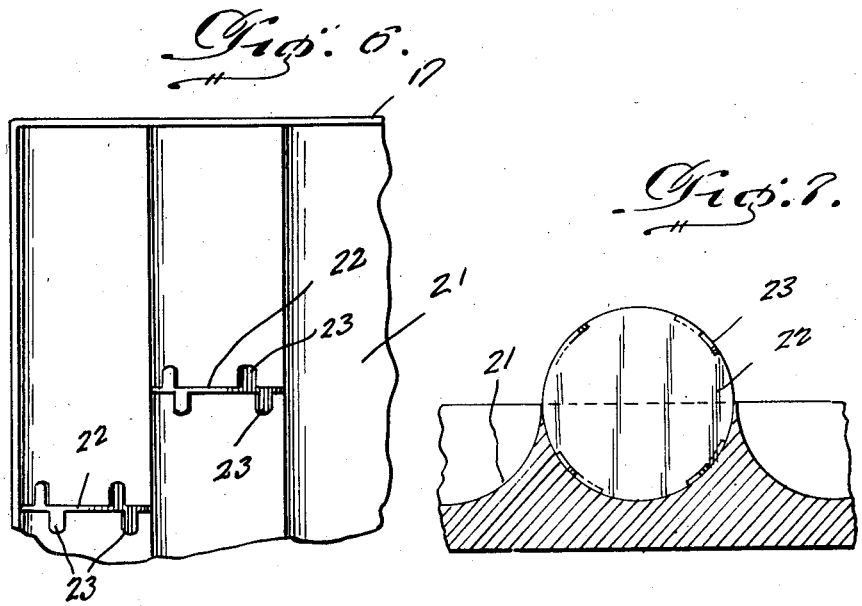
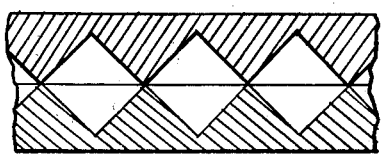
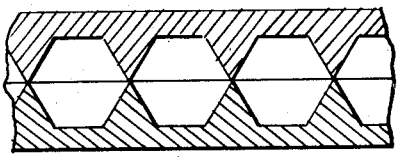
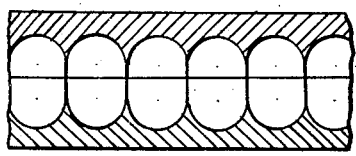
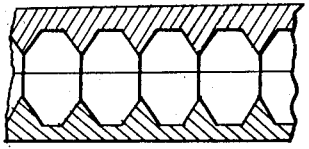
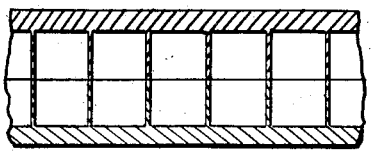
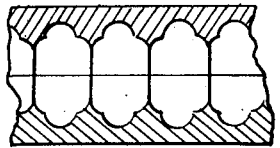
Inventor
J. F. Connell
By Clarence A. O'Brien
Attorney Patented July 31, 1928.

1,678,690

UNITED STATES PATENT OFFICE.

JAMES FRANCIS CONNELL, OF LINCOLN, NEBRASKA.

BAKING DEVICE.

Application filed June 24, 1927. Serial No. 201,165.

The present invention relates broadly to an improved baking device and it has more particular reference to one which is on the order of a waffle iron, the same being constructed to adapt it for use in the home, in lunch rooms, restaurants, and the like.

The invention has particular reference to a device of this class which is especially, although not necessarily, operated from electricity.

Briefly, the invention has reference to a device of this class which includes, among other parts, an especially designed base, and a swingably mounted baking structure supported on the base at the center and capable of being swung in either direction to render it reversible.

The main important and most essential idea, is the complete, compact and uniform arrangement of the compartments for baking, these being such as to make them easy to fill, simple to operate, and empty and perfectly adaptable for introduction of a suitable filler.

I propose to improve upon known, marketed and patented structures of this class, by providing one which is comparatively simple and inexpensive, highly efficient in operation, sturdy in construction, dependable and such that it is characterized by individual compartments for baking separate dainties.

Other features and advantages of the invention will become apparent from the following drawings and description.

In the drawings:—

Fig. 3 is a cross section taken approximately upon the plane of the line 3—3 of Fig. 2.

Fig. 4 is a central longitudinal section through the improved baking device.

Fig. 5 is a top plan view of the sections of said device.

Fig. 6 is a fragmentary top plan view of a portion of one of the sections, showing removable partition elements, such as are utilized.

Fig. 7 is a view of Fig. 6, showing the position of one of these partition elements.

Figure 1:
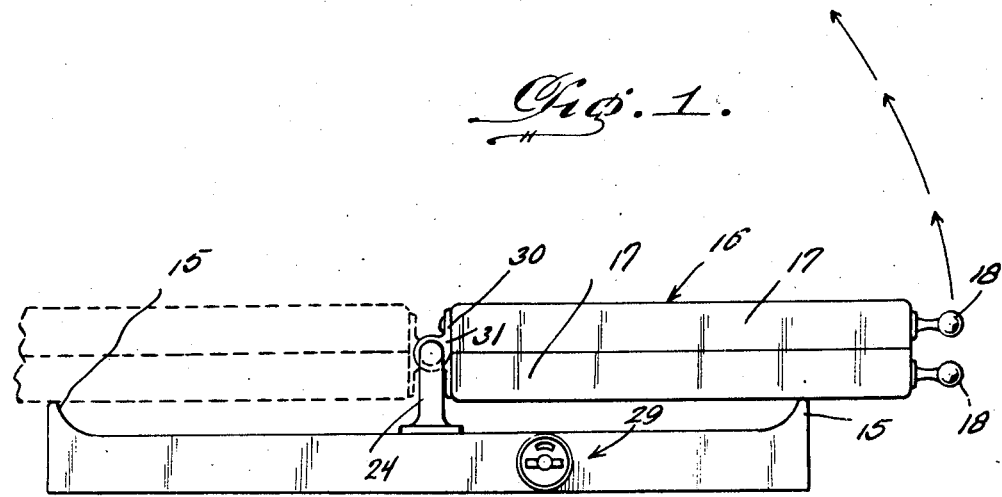
Figure 1 is a side elevation of a complete device constructed in accordance with the present invention and idea.

Figs. 8, 9, 10 and 11, and 12, 13, show fragmentary detail sectional views showing different configurations of baking compartments employed to individualize the product.

Referring now to the drawings by reference characters, it would be observed that the reference character 14 designates generally the improved base. This is preferably in the form of a hollow casting of general rectangular configuration, the same being open on its bottom and an appropriate closure plate being provided as shown for example in Fig. 3. The base is made hollow to render it light in weight, and to facilitate wiring.

Particular attention is directed to the upstanding fins 15 at the opposite ends which form rests for the swingably mounted baking device 16. This baking device, it will be noticed, is of a width less than the base so that the longitudinal edge portions of the base project beyond the corresponding edge portions of the baking device, the baking device being bodily swingable and is composed of duplicate and complemental half sections 17, these being formed of individual handles 18 for convenience of operation and opening.

Each section 17 embodies an outer case or shell preferably of rectangular configuration and of a depth to accommodate removable units as shown in Fig. 4. These units fit snugly within the shell, being preferably composed of aluminum. They cooperate with appropriate electric heating elements 19 separated from the casing by asbestos linings 20. These units, irrespective of the shape of the compartment 21, is of old configuration.

In this connection, it will be noticed that the units come together in firm contact and are provided with opposed grooves or channels forming the individual compartments. The meeting portions of the respective grooves are of knife-like form. Thus, a multiplicity of individual baking compartments of appropriate configuration are provided. With this knife-like construction, more compartments are permitted within a given area.

In Figs. 4, 5, and 6 and 7 for example, the grooves are of semi-cylindrical cross section, thus forming cylindrical baking compartments. In Fig. 8, the grooves are of triangular cross section, thus forming a diamond-shaped compartment. In Fig. 9, the grooves are such as to form substantially hexagonal compartments. In Fig. 10 the compartments are somewhat ovate in configuration; whereas, in Fig. 11, the compartments are somewhat like those in Fig. 9, being slightly elongated, in vertical direction. Figs. 12 and 13 also represent compartments of slightly different configuration. In all instances, the aluminum units are removable so that they are interchangeable, thus permitting the user to form objects of varied shape.

In connection with the foregoing, I would invite attention to Figs. 6 and 7, wherein it will be noticed that I provide removable disk partitions 22 which fit into the cylindrical compartments. These disks are provided with outstanding circumferentially spaced ears 23 which form four supporting feet. With this arrangement, the disks can be arranged at appropriate points in the compartment for making objects of different lengths.

Figure 2:
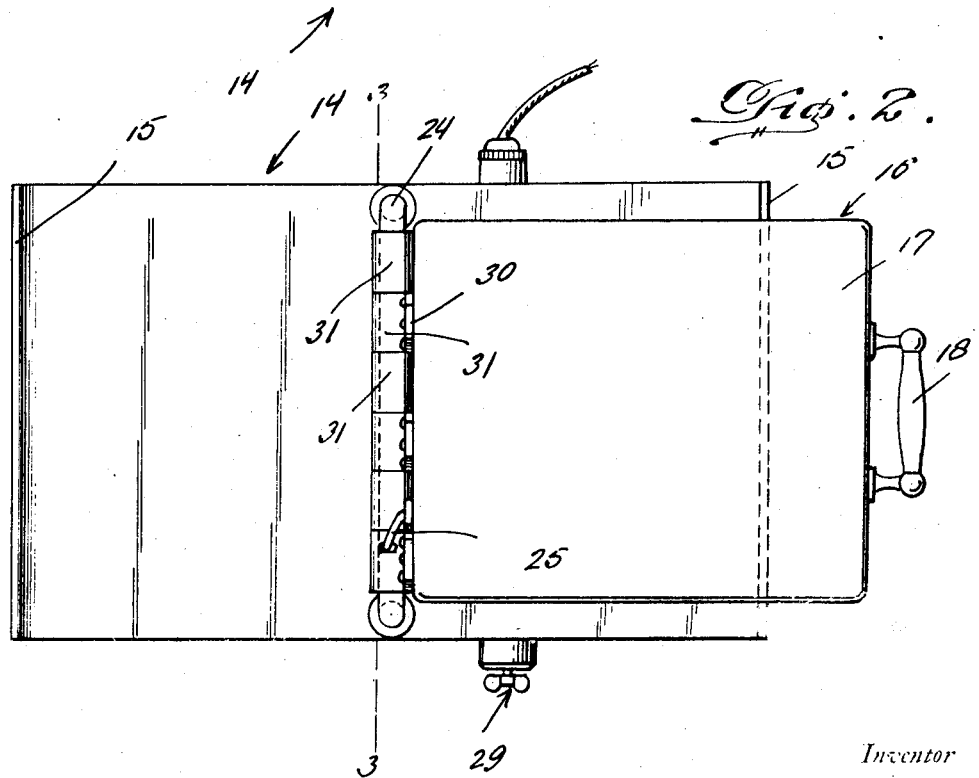
Fig. 2 is a top plan view of the same showing the baking device swung over to the right.

A special hinge is provided whereby the baking device is bodily swingable upon the base, and this hinge is better shown in Figs. 1, 2, and 3. In Fig. 3, it will be noticed that the stationary portion 24 is in the form of an arched tube or pipe, the downturned ends resting upon the top surface of the base, and being provided with threaded nipples extending through apertures in the base and held in place by retaining nuts. Adjacent the downturned ends this tube is formed with a pair of slots, through which the lead-in wires 25 extend. Two of these wires, one extending to the units in the top section of the baking device, and the other to the heating elements in the bottom section.

A current supply wire 26 having a plug 27 is provided, it being in electrical connection with complemental wires 28 which lead to a switch 29 on an opposite side of the base.

Fastened to the end of the casing sections of the baking devices, by flanges 30, are tubular knuckles 31, these surrounding the bight portion of the stationary part 24 of the hinge, and are arranged in alternating fashion so that when they are mounted, they are in end to end abutting relation.

It will be noticed that the two end knuckles are formed with slots matching the aforesaid slots to accommodate the lead-in wires 25. This allows free bodily swinging of the baking device without disrupting the lead-in wires.

From the foregoing description and drawings, it will be seen that I have evolved and produced an exceptionally novel device for baking dough dainties of various configurations. Attention is particularly invited to the complete cooking surfaces of the aluminum units, and especially to the knife-edge points of contact defining the individual compartments, also the united and compact arrangement makes it possible to bake more units in a given amount of space than in any other device now in use.

In having a solid baking surface, any filler can be added without interfering with the functioning of the device, and the filler embeds itself in the dough. The partitions make it possible to have various sizes made in the same compartment. As the baking units are made of aluminum the finished product is spaced perfectly and without grease and is easily removed as it does not stick to the surfaces. A uniform product of appropriate configuration is made quickly, easily and perfectly.

The base is particularly useful as a sanitary table top for catching drippings owing to the difference in width between the base and the baking device. In addition, the base is constructed to provide supports for the ends for the sections of the baking device to facilitate air circulation and to promote rapid heating.

The device is compact and convenient, owing to the presence of the novel hinge, and the arrangement whereby the hinge accommodates wires. In addition, the device is, as before stated, bodily swingable throughout an approximate half circle permitting filling of either side and permitting either side to operate as the top.

It is believed that after considering the foregoing in connection with the drawings, a clear understanding of the construction and advantages of the invention will be had. For this reason, a more lengthy description is believed to be unnecessary.

While the preferred embodiment of the invention has been illustrated and particularly described, it is to be understood that minor changes coming within the field of invention claimed may be resorted to if desired.

Having thus described my invention, what I claim as new is:—

In a structure of the class described, a base, a baking device hingedly mounted on said base, said baking device being composed of duplicate hingedly connected superimposed sections, said sections being formed with removable baking units, said baking units being grooved to provide individual compartments, together with individual partition elements receivable in said grooves for making objects of different sizes.

In testimony whereof I affix my signature.

JAMES FRANCIS CONNELL.